(12) United States Patent
Wood

(10) Patent No.: US 7,009,517 B2
(45) Date of Patent: Mar. 7, 2006

(54) METHOD FOR MONITORING OBJECTS WITH TRANSPONDERS

(75) Inventor: Christopher Ivor Wood, Brentford (GB)

(73) Assignee: Glaxo Group Limited, Greenford (GB)

(*) Notice: Subject to any disclaimer, the term of this patent is extended or adjusted under 35 U.S.C. 154(b) by 57 days.

(21) Appl. No.: 10/296,371

(22) PCT Filed: May 2, 2001

(86) PCT No.: PCT/EP01/04972

§ 371 (c)(1),
(2), (4) Date: Dec. 2, 2002

(87) PCT Pub. No.: WO01/91080

PCT Pub. Date: Nov. 29, 2001

(65) Prior Publication Data

US 2003/0146836 A1    Aug. 7, 2003

(30) Foreign Application Priority Data

May 24, 2000  (GB)  .................................... 0012465

(51) Int. Cl.
*G08B 13/14* (2006.01)
(52) U.S. Cl. ............................. 340/572.1; 340/539.26; 340/572.8
(58) Field of Classification Search .............. 340/572.1, 340/573.1, 505, 540, 522, 988, 10.1, 539.13, 340/539.26, 825.49, 5.92, 572.8; 235/375, 235/384, 385, 487; 705/28; 700/115
See application file for complete search history.

(56) References Cited

U.S. PATENT DOCUMENTS

| | | | |
|---|---|---|---|
| 4,679,426 A | 7/1987 | Fuller et al. | |
| 4,724,427 A | 2/1988 | Carroll et al. | |
| 4,817,822 A | 4/1989 | Rand et al. | |
| 4,940,966 A | 7/1990 | Pettigrew et al. | |
| 5,025,246 A | 6/1991 | Schenkel et al. | |
| 5,321,619 A | 6/1994 | Matsuda et al. | |
| 5,347,274 A * | 9/1994 | Hassett ....................... | 340/988 |
| 5,363,842 A | 11/1994 | Mishelevich et al. | |
| 5,368,948 A | 11/1994 | Davies et al. | |
| 5,381,137 A | 1/1995 | Ghaem et al. | |
| 5,448,110 A | 9/1995 | Tuttle et al. | |
| 5,469,363 A | 11/1995 | Saliga | |
| 5,491,473 A | 2/1996 | Gilbert | |
| 5,505,195 A | 4/1996 | Wolf et al. | |
| 5,507,277 A | 4/1996 | Rubsamen et al. | |
| 5,508,203 A | 4/1996 | Fuller et al. | |
| 5,516,692 A | 5/1996 | Berndt | |
| 5,520,166 A | 5/1996 | Ritson et al. | |
| 5,528,221 A | 6/1996 | Jeuch et al. | |
| 5,541,604 A | 7/1996 | Meier et al. | |

(Continued)

FOREIGN PATENT DOCUMENTS

DE            19621179          11/1997

(Continued)

*Primary Examiner*—Thomas Mullen
(74) *Attorney, Agent, or Firm*—James P. Riek (57) ABSTRACT

There is provided a method for tracking environmental exposure of an object comprising selecting the object; associating a radiofrequency identifier with the object, the radiofrequency identifier comprising an antenna for transmitting or receiving radiofrequency energy; and an integrated circuit chip connecting with said antenna, said chip having a memory; exposing the object to an environmental condition; measuring environmental condition as an environmental parameter with a sensor physically separate from the radiofrequency identifier; and writing the environmental parameter to the memory of the chip by transmitting radiofrequency energy thereto.

59 Claims, 9 Drawing Sheets

U.S. PATENT DOCUMENTS

| | | |
|---|---|---|
| 5,549,101 A | 8/1996 | Trofast et al. |
| 5,560,353 A | 10/1996 | Willemot et al. |
| 5,582,795 A | 12/1996 | Nishina et al. |
| 5,583,819 A | 12/1996 | Roesner et al. |
| 5,587,578 A | 12/1996 | Serra |
| 5,608,739 A | 3/1997 | Snodgrass et al. |
| 5,629,981 A | 5/1997 | Nerlikar |
| 5,682,143 A | 10/1997 | Brady et al. |
| 5,706,801 A | 1/1998 | Remes et al. |
| 5,755,218 A | 5/1998 | Ritson et al. |
| 5,770,455 A | 6/1998 | Cargill et al. |
| 5,771,657 A | 6/1998 | Lasher et al. |
| 5,774,875 A | 6/1998 | Medeiros et al. |
| 5,777,303 A | 7/1998 | Berney |
| 5,792,668 A | 8/1998 | Fuller et al. |
| 5,796,602 A | 8/1998 | Wellan et al. |
| 5,799,651 A | 9/1998 | Garby et al. |
| 5,809,997 A | 9/1998 | Wolf |
| 5,813,397 A | 9/1998 | Goodman et al. |
| 5,821,524 A | 10/1998 | Horlbeck et al. |
| 5,831,859 A | 11/1998 | Medeiros et al. |
| 5,844,802 A | 12/1998 | Lepper et al. |
| 5,874,214 A | 2/1999 | Nova et al. |
| 5,874,896 A | 2/1999 | Lowe et al. |
| 5,892,441 A | 4/1999 | Woolley et al. |
| 5,898,370 A | 4/1999 | Reymond |
| 5,920,054 A | 7/1999 | Uber |
| 5,955,950 A | 9/1999 | Gallagher et al. |
| 5,959,531 A | 9/1999 | Gallagher, III et al. |
| 5,961,925 A | 10/1999 | Ruediger et al. |
| 5,963,136 A | 10/1999 | O'Brien et al. |
| 5,972,156 A | 10/1999 | Brady et al. |
| 5,981,166 A | 11/1999 | Mandecki |
| 5,986,562 A | 11/1999 | Nikolich |
| 6,002,344 A | 12/1999 | Bandy et al. |
| 6,008,727 A | 12/1999 | Want et al. |
| 6,017,496 A | 1/2000 | Nova et al. |
| 6,018,299 A | 1/2000 | Eberhardt et al. |
| 6,025,780 A | 2/2000 | Bowers et al. |
| 6,032,666 A | 3/2000 | Davies et al. |
| 6,040,773 A | 3/2000 | Vega et al. |
| 6,040,774 A | 3/2000 | Schepps |
| 6,046,003 A | 4/2000 | Mandecki et al. |
| 6,049,278 A | 4/2000 | Guthrie et al. |
| 6,078,845 A | 6/2000 | Friedman |
| 6,147,604 A | 11/2000 | Wiklof et al. |
| 6,148,815 A | 11/2000 | Wolf |
| 6,202,642 B1 | 3/2001 | McKinnon et al. |
| 6,259,654 B1 | 7/2001 | de la Huerga |
| 6,294,999 B1 | 9/2001 | Yarin et al. |
| 6,366,824 B1 | 4/2002 | Nair et al. |
| 6,594,611 B1 | 7/2003 | Beffa |
| 6,729,327 B1 | 5/2004 | McFarland |
| 6,729,330 B1 | 5/2004 | Scarrott et al. |
| 6,839,604 B1 | 1/2005 | Godfrey et al. |
| 2002/0198618 A1 | 12/2002 | Madden et al. |
| 2003/0011476 A1 | 1/2003 | Godfrey et al. |
| 2003/0064029 A1 | 4/2003 | Tarara et al. |
| 2003/0079744 A1 | 5/2003 | Bonney et al. |
| 2003/0183697 A1 * | 10/2003 | Porter ........................ 235/492 |
| 2003/0783226 | 10/2003 | Brand et al. |
| 2004/0025871 A1 | 2/2004 | Davies |
| 2004/0100415 A1 | 5/2004 | Veitch et al. |

FOREIGN PATENT DOCUMENTS

| | | |
|---|---|---|
| DE | 19753619 | 5/1999 |
| DE | 19806049 | 8/1999 |
| DE | 19826568 | 12/1999 |
| DE | 29915334 | 1/2000 |
| EP | 645631 | 3/1995 |
| EP | 727752 | 8/1996 |
| EP | 786357 | 7/1997 |
| EP | 831410 | 3/1998 |
| EP | 853288 | 7/1998 |
| EP | 859299 | 8/1998 |
| EP | 895087 | 2/1999 |
| EP | 908840 | 4/1999 |
| EP | 947952 | 10/1999 |
| EP | 0967568 | 12/1999 |
| EP | WO 00/03313 | 1/2000 |
| FR | 2656446 | 6/1991 |
| FR | 2760209 | 9/1998 |
| GB | 2262452 | 6/1993 |
| GB | 2308947 | 7/1997 |
| GB | 2312595 | 10/1997 |
| GB | 2314418 | 12/1997 |
| GB | 2328281 | 2/1999 |
| JP | 08195697 | 7/1996 |
| JP | 10013295 | 1/1998 |
| JP | 10040329 | 2/1998 |
| JP | 10049620 | 2/1998 |
| JP | 10123147 | 5/1998 |
| JP | 11304812 | 11/1999 |
| JP | 11352243 | 12/1999 |
| WO | WO 92/12402 | 7/1992 |
| WO | WO 92/17231 | 10/1992 |
| WO | 9407225 | 3/1994 |
| WO | WO 95/22365 | 8/1995 |
| WO | WO 96/31790 | 10/1996 |
| WO | WO 97/04338 | 2/1997 |
| WO | WO 97/07443 | 2/1997 |
| WO | WO 97/10896 | 3/1997 |
| WO | WO 98/26312 | 6/1997 |
| WO | WO 98/05088 | 2/1998 |
| WO | WO 98/15853 | 4/1998 |
| WO | WO 98/35243 | 8/1998 |
| WO | WO 98/46548 | 10/1998 |
| WO | WO 99/35091 | 7/1999 |
| WO | WO 99/35516 | 7/1999 |
| WO | WO 99/48044 | 9/1999 |
| WO | WO 99/49408 | 9/1999 |
| WO | WO 99/50690 | 10/1999 |
| WO | WO 99/65002 | 12/1999 |
| WO | WO 99/67099 | 12/1999 |
| WO | WO 9965548 | 12/1999 |
| WO | WO 00/21030 | 4/2000 |
| WO | WO 00/21032 | 4/2000 |
| WO | WO 0025720 | 5/2000 |
| WO | WO 01/24690 | 4/2001 |
| WO | WO 01/63368 | 8/2001 |

* cited by examiner

METHOD FOR MONITORING OBJECTS WITH TRANSPONDERS

CROSS REFERENCE TO RELATED APPLICATION

This application is filed pursuant to 35 USC 371 as a United States National Phase Application of International Patent Application Serial No. PCT/EP01/04972 filed May 2, 2001, which claims priority from GB 0012465.1 filed on May 24, 2000 in the United Kingdom.

FIELD OF THE INVENTION

The present invention relates to a method of monitoring exposure of an object to environmental conditions. In particular, it relates to a method of tracking environmental exposure of medicaments and medical devices to a range of environmental conditions using radio frequency identification tags.

BACKGROUND OF THE INVENTION

Exposure to environmental conditions, such as temperature, moisture and pressure, can have a marked effect upon the storage or shelf life of many products. Many chemicals and biological products, for example those used in medicaments, are sensitive to changes in temperature and/or moisture, with relatively small variations in either leading to instability and breakdown due to chemical hydrolysis and/or microbial decay. Product stability may also be influenced by light and UV levels, necessitating the incorporation of various UV stabilisers in many chemical and biological formulations.

A wide range of other products are also sensitive to environmental change. Foodstuffs, such as fresh foods and drinks, are extremely susceptible to temperature fluctuations, both high and low temperatures causing deterioration in the quality of the food or drink due to chemical and/or microbiological degradation.

The manufacture and distribution of many products, particularly medicaments, requires careful monitoring of environmental exposure to ensure compliance with product specifications. Manufacturers are known to incorporate sensors of various types into their products in order that they can monitor environmental exposure and thereby the quality of their product. For example, temperature sensors are used in the food industry to indicate the temperature of food products and even record their previous exposure to a range of temperatures.

Similar devices are employed to indicate whether frozen foodstuffs have been allowed to thaw and refreeze.

These methods, however, are expensive as they require individual sensors to be attached to each product.

The Applicants have now devised an improved method of monitoring environmental exposure of a product, particularly from the point of manufacture to sales. Furthermore, the method can be used to check environmental compliance of the product throughout the manufacture-distribution-storage process. The method involves associating a passive radiofrequency identification (RFID) tag or transponder with an object, or a container for the object, and writing environmental data to the tag from a separate sensor exposed to the same environmental conditions. The environmental data are read, on energising by a reader/writer, either continuously or at defined points throughout the manufacture-distribution-storage process and checked for compliance against defined criteria. Non-compliance results in rejection of the object and/or recall of the object by the manufacturer. Alternatively, non-compliance may result in a reduction of the effective shelf-life of the object, as in the case of medicaments and perishable goods.

The RFID tag can be configured to have a memory structure which allows for large amounts of discrete information to be stored thereon. Transfer of information to or from the memory is readily achievable by the use of a reader/writer which is typically remote from the object, thereby minimising the need for direct product handling. In further aspects, the reader/writer can be arranged to simultaneously read, or write to, the memory of multiple RFID tags on multiple objects.

A principal advantage of the present invention is the capability of the memory of the RFID tag to store many environmental data items which are written to the memory at various defined points in the manufacturing-distribution-storage process. The memory thereby provides a detailed and readily accessible 'environmental exposure' history. The environmental information could, for example, also include date and time stamps. The memory might also be configured to include a unique serial number stored in encrypted form or in a password protectable part of the memory which uniquely identifies the product. The information could also include basic product information such as the nature of the product and usage information, customer information and distribution information such as the intended product destination.

The use of RFID tags to monitor environmental exposure is known in the art. Thus GB 2308947 discloses RFID tags having sensors incorporated within the transponder which can transmit environmental data to a remote reader on energising therefrom. Similar devices relating to RFID tags possessing built-in sensors are described for biomedical GB 2297225 and agricultural GB 2249001, GB 2076259 applications.

The principal advantages of the Applicant's invention over those disclosed in the literature are those of simplicity and cost. By eliminating the need to build individual sensors into each tag the Applicant's have devised a simplified method of monitoring environmental exposure at significantly reduced cost to the user.

SUMMARY OF THE INVENTION

According to one aspect of the present invention there is provided a method for tracking environmental exposure of an object comprising selecting an object; associating a radiofrequency identifier with the object, the radiofrequency identifier comprising an antenna for transmitting or receiving radiofrequency energy; and an integrated circuit chip connecting with the antenna, the chip having a memory; exposing the object to an environmental condition; measuring the environmental condition as an environmental parameter with a sensor physically separate from the radiofrequency identifier; and writing the environmental parameter to the memory of the chip by transmitting radiofrequency energy thereto.

The object may be exposed to environmental conditions throughout its lifetime. Whilst environmental conditions are likely to be stringently controlled during the manufacturing process this is not always necessarily the case in all industries and in all manufacturing localities. Variation in environmental conditions are most likely during product transport and storage; for example, transport at reduced temperatures and pressures during air freight, or on delivery to storage depots in the tropics.

The radiofrequency identifier can be any known radiofrequency identifier. Such identifiers are sometimes known as radiofrequency transponders or radiofrequency identification tags. Suitable radiofrequency identifiers include those sold by Phillips Semiconductors of the Netherlands under the trade marks Hitag, and Icode those sold by Amtech Systems Corporation of the United States of America under the trade mark Intellitag, and those sold by Texas Instruments of the United States of America under the trade mark Tagit.

The RFID tags herein may be used in combination and/or integrated with other traditional product labelling methods including visual text, machine-readable text, bar codes and dot codes.

In one aspect, the sensor writes the environmental parameter to the memory of the chip.

In another aspect, the sensor transmits the environmental parameter to a reader/writer which writes the parameter to the memory of the chip.

In a further aspect, the sensor measures plural environmental conditions as plural environmental parameters. The environmental condition is selected from the group consisting of temperature, humidity, pressure, electromagnetic radiation, light, acceleration and chemical concentration.

In another aspect, the writing of the environmental parameter to the memory is continuously or periodically transmittable from the sensor or the reader/writer. Preferably, the writing of the environmental parameter to the memory is transmittable post-production, post-storage or post-transport of the object. This has the advantage that it reduces the need for a reader/writer in each production, storage and transport container or environment by using centralised reader/writers in each of these areas. Thus environmental parameters are written to the tags at the end of production, storage and transport of the object.

In a further aspect, a data processor associated with the sensor or reader/writer processes the environmental parameter data prior to transmitting them to the memory. The data may be processed to determine, for example, the rate of change or the length of exposure to any given environmental parameter. These analysed data may also be written to the chip memory.

Preferably, the method additionally comprises reading the memory by transmitting radiofrequency energy from a reader/writer to the radiofrequency identifier. The reading may occur during or post-production, storage or transport of the object.

In one aspect, the memory comprises a unique signature data item and the reading step comprises reading the unique signature data item.

Preferably, the reading step additionally comprises reading at least one environmental parameter. More preferably, the reading step additionally comprises checking the at least one environmental parameter against a defined compliance criterion.

In another aspect, non-compliance with any check results in rejection of the associated object. Non-compliance may alternatively result in a modification of the effective shelf-life or lifetime of the object, which is written to the tag memory.

Thus, for example, the shelf-life of a medicament may be modified depending upon its exposure to pre-defined environmental conditions.

Preferably the method additionally comprises a final reading step involving reading all environmental parameters in the memory by transmitting radiofrequency energy to the radiofrequency identifier. More preferably, the method additionally comprises checking all environmental parameters against defined full compliance criteria. Most preferably, non-compliance against compliance data results in rejection of the object.

In one aspect, the radiofrequency identifier connects to the object.

In another aspect, the object is associated with a container and the radiofrequency identifier connects to the container. Preferably, the container assists in transport of the object.

Preferably, the sensor and the object or the container are exposed to the same environment. More preferably, the same environment is selected from the group consisting of production facility, warehouse, container transporter and depot.

In one aspect, the object is a container for a medicament.

In another aspect, the object is a medical device. Preferably, the medical device is an inhalation device. More preferably, the inhalation device comprises an aerosol canister containing a suspension of medicament in a propellant. More preferably, the propellant comprises liquefied HFA134a, HFA-227 or carbon dioxide. Most preferably, the aerosol canister comprises a solution of a medicament in a solvent.

Preferably, the inhalation device comprises a cartridge for medicament in dry-powder form. More preferably, the dry-powder cartridge comprises a blister pack.

Preferably, the medicament is selected from the group consisting of albuterol, salmeterol, fluticasone propionate, ipratropium bromide, beclomethasone dipropionate, salts or solvates thereof and any mixtures thereof.

In another aspect, the object is a container for a food. Preferably, the food is selected from the group consisting of meat, mycoprotein, milk, cheese, flour, pasta, rice, oil, sugar, confectionery, vegetable, herbal, snack, convenience and fruit foodstuffs.

In a further aspect, the object is a container for a beverage. Preferably, the beverage is selected from the group consisting of water, milk, coffee, cocoa, tea, fruit, carbonated and alcoholic drinks.

In another aspect, the object is a container for a toiletry. Preferably, the toiletry is selected from the group consisting of toothpaste, soap, mouthwash, shampoo, skin and face cream.

In a further aspect, the object is a container for an electronic component. Preferably, the electronic component is selected from the group consisting of semi-conductor, integrated circuit chip, fuse and battery.

In another aspect, the object is a container for a cleanser. Preferably, the cleanser is selected from the group consisting of soap, detergent, enzymic preparation and organic solvent.

In a further aspect, the object is a container for a disinfectant. Preferably, the disinfectant is selected from the group consisting of sterilant, antiseptic and bleach.

In another aspect, the object is a container for a light-sensitive material. Preferably, the light-sensitive material comprises a photographic film.

In a further aspect, the object is a container for a marking material. Preferably, the marking material is selected from the group consisting of toner, ink, dye, pigment, acid and alkali.

In another aspect, the object is a container for a covering material. Preferably, the covering material is selected from the group consisting of paint, pigment, dye, corrosion inhibitor, electrical conductor, electrical insulator and static inhibitor.

In a further aspect, the object is a container for a diesel- or petrol-based fuel oil.

In another aspect, the object is a container for an adhesive. Preferably, the adhesive bonds materials selected from the group consisting of paper, plastic, wood, rubber, glass and metal.

In a further aspect, the object is a container for an agrochemical. Preferably, the agrochemical is selected from the group consisting of herbicide, insecticide, fungicide, rodenticide, nematocide, acaracide and plant growth regulator.

In another aspect, the object is a container for a contraceptive. Preferably the contraceptive is either a contraceptive device or a contraceptive drug. More preferably, the contraceptive device is selected from the group consisting of condom, diaphragm, sponge and coil. More preferably, the contraceptive drug is selected from the group consisting of spermacide, estrogen, ethinyl estradiol, progesterone, levonorgestrel and norgestrel.

In a further aspect, the object is a container for a biological material. Preferably, the biological material is selected from the group consisting of polynucleotide, peptide, enzyme, hormone, protein, cell line and tissue. More preferably, the biological material is a mammalian or human organ. More preferably, the biological material is a plant seed derived from a monocotyledonous or dicotyledonous plant. Optionally, the biological material is an animal.

In one aspect, the antenna is capable of transmitting or receiving radiofrequency energy having a frequency of from 50 KHz to 2.5 GHz. Preferably, the antenna is adapted to transmit or receive radiofrequency energy having a frequency of 125 KHz. More preferably, the antenna is adapted to transmit or receive radiofrequency energy having a frequency of 13.56 MHz. More preferably, the antenna is adapted to transmit or receive radiofrequency energy having a frequency of 2.4 GHz.

In another aspect, the radiofrequency identifier is on a carrier suitable for mounting to the object or the container therefor. The carrier is preferably a flexible label, rigid disc or a rectangular block, although other shapes and forms of carrier are envisaged.

In a further aspect, the carrier is mouldable to the object or the container.

Preferably, the carrier encases the radiofrequency identifier. More preferably, the carrier forms a hermetic seal for the radiofrequency identifier. More preferably, the carrier comprises an insulating material such as a glass material, paper material or organic polymeric material.

In another aspect, the integrated circuit chip has plural memory areas thereon. The plural memory areas can be selected from a read only memory area, a write only memory area, a read/write memory area, a one time programmable memory area, a pre-set, non-amendable memory area and any mixtures thereof. Preferably, any memory area contains data in encrypted form and/or is password protected.

Preferably, the reader/writer is capable of following an anti-contention protocol and reading multiple radiofrequency identifiers simultaneously by differentiating between individual radiofrequency identifiers within the same antenna field. More preferably, the reader/writer is capable of writing to a plurality of individual radiofrequency identifiers simultaneously.

In one aspect, the method additionally comprises transferring each environmental data item read from the memory or transmitted from the reader/writer to an electronic data management system comprising a data memory for storage of data; a microprocessor for performing operations on the data; and a signal output for outputting a signal relating to the data or the outcome of an operation on the data. The electronic data management system may be connected to a networked computer system by any suitable method including a hard-wired link or a wireless communications link such as one based on infrared or radiofrequency links.

In another aspect, the method additionally comprises transferring each environmental data item read from the memory to a distributed electronic data management system comprising plural electronic data collectors, each comprising a data memory for storage of data; a microprocessor for performing operations on the data; and a signal output for outputting a signal relating to the data or the outcome of an operation on the data, wherein the plural electronic data collectors are in network relationship to form the distributed electronic data management system.

In one aspect, the electronic data collectors may comprise what is known in the art as 'field devices' which are used for local data collection. Each 'field device' may be capable of wireless communication to the other or to the electronic data management system.

In another aspect, the electronic data management system forms part of a robotics system.

Preferably, the method additionally comprises a communicator for wireless communication with a gateway to a network computer system to enable transfer of data between the network computer system and the electronic data management system. More preferably, the method enables two-way transfer of data between the network computer system and the electronic data management system.

The communication may be via radiofrequency or optical signals.

In one aspect, the communicator communicates directly with the gateway.

In another aspect, the communicator communicates with the gateway via a second communications device. Preferably, the second communications device is a telecommunications device, more preferably a cellular phone or pager. Preferably, the communicator communicates with the second communications device using spread spectrum radiofrequency signals. A suitable spread spectrum protocol is the Bluetooth (trademark) standard which employs rapid (e.g. 1600 times a second) hopping between plural frequencies (e.g. 79 different frequencies). The protocol may further employ multiple sending of data bits (e.g. sending in triplicate) to reduce interference.

Preferably, the data are communicable between the network computer system and the electronic data management system in encrypted form. All suitable methods of encryption or partial encryption are envisaged. Password protection may also be employed.

In one aspect, the network computer system comprises a public access network computer system. The Internet is one suitable example of a public access networked computer system, wherein the gateway can be any suitable gateway thereto including gateways managed by an Internet service provider. The public access network computer system may also form part of a telecommunications system, which may itself be either a traditional copper wire system, a cellular system or an optical network.

In another aspect, the network computer system comprises a private access network computer system and the gateway is a secure gateway. The private access network system may, for example, comprise an intranet or extranet maintained by a medicament manufacturer. The secure gateway may, for example, include password protection; a firewall; and suitable encryption means.

The method preferably comprises communicating with a user-specific network address in the network computer system. More preferably, the user-specific network address is selected from the group consisting of a web-site address, an e-mail address and a file transfer protocol address.

In another aspect of the present invention, there is provided a system for tracking environmental exposure of an object according to the method hereinbefore described, comprising a radiofrequency identifier comprising an antenna for transmitting and receiving radiofrequency energy; and an integrated circuit chip connecting with said antenna, said chip having a memory; a physically separate sensor capable of measuring an environmental condition as an environmental parameter and writing said environmental parameter to the memory of the chip by transmitting radiofrequency energy thereto.

In one aspect, the sensor transmits the environmental parameter to the memory of the chip.

In another aspect, the sensor transmits the environmental parameter to a reader/writer which writes the parameter to the memory of the chip.

In a further aspect, the system additionally comprises a reader/writer for reading data from the radiofrequency identifier by transmitting radiofrequency energy thereto and receiving radiofrequency energy therefrom.

In another aspect, the system additionally comprises an electronic data management system and a network computer system according to the method as hereinbefore described.

Embodiments of methods according to the invention will now be described with reference to the accompanying drawings in which.

BRIEF DESCRIPTION OF THE SEVERAL VIEWS OF THE DRAWINGS

DETAILED DESCRIPTION

Figure 1A:
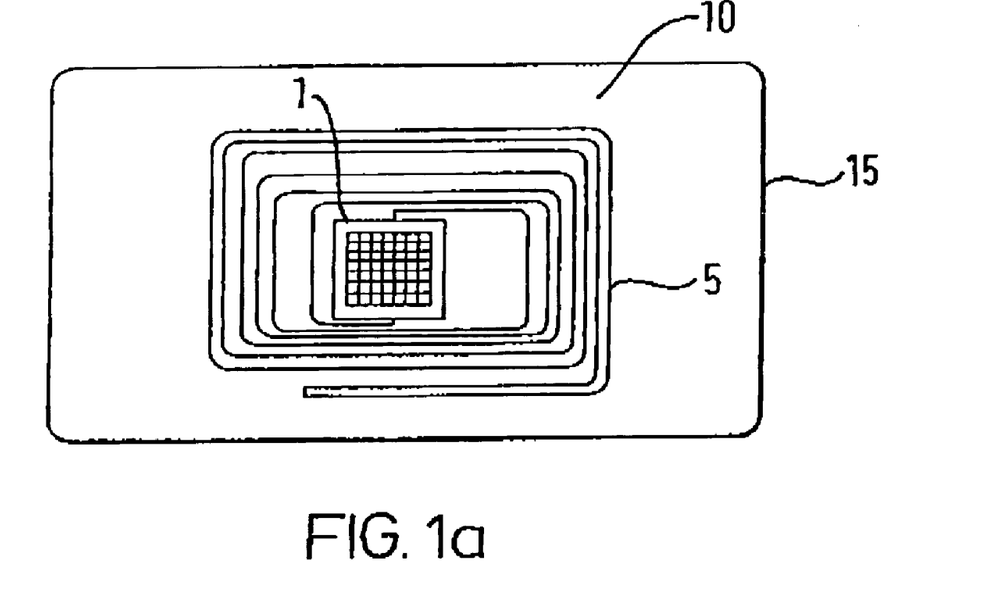
FIG. 1a is a diagram of a radiofrequency identification (RFID) tag mounted on a rectangular shaped carrier.
Figure 1B:
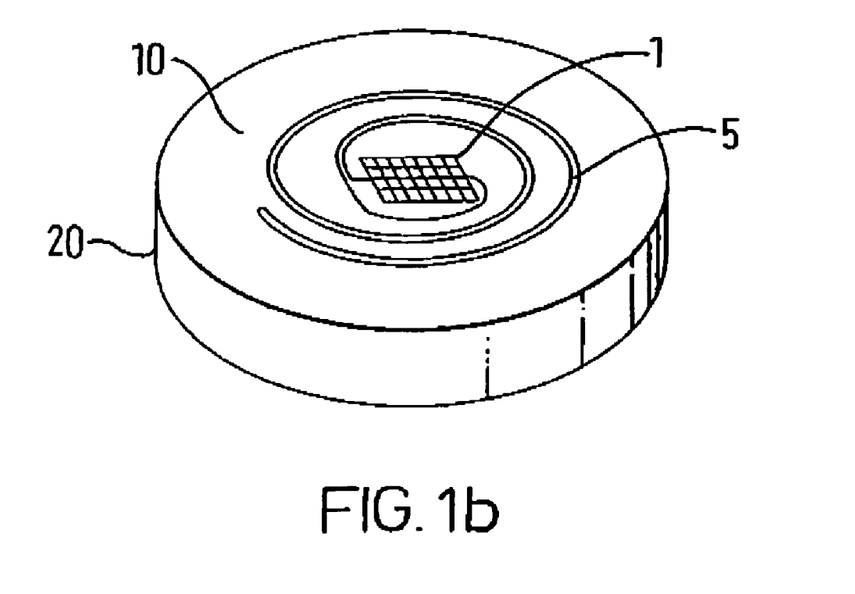
FIG. 1b is a diagram of a RFID tag mounted on a disc shaped carrier.

The basic components of an RFID tag are shown in FIGS. 1a and 1b. The tag comprises a memory chip 1 which is capable of storing, transmitting and receiving information and an antenna 5. Data can be received by, or transmitted from, the chip via antenna 5 which is connected to the chip. The antenna 5, is capable of receiving or transmitting radiofrequency energy over a wide bandwidth, ranging from 50 KHz to 2.5 GHz. The tags 10 are mounted on a rectangular 15 (FIG. 1a) or disc 20 (FIG. 1b) shaped carrier. The carrier, which generally comprises an insulating material such as glass, may take several forms such as a flexible label (FIG. 1a), a rectangular block or a rigid disc (FIG. 1b).

Figure 2:
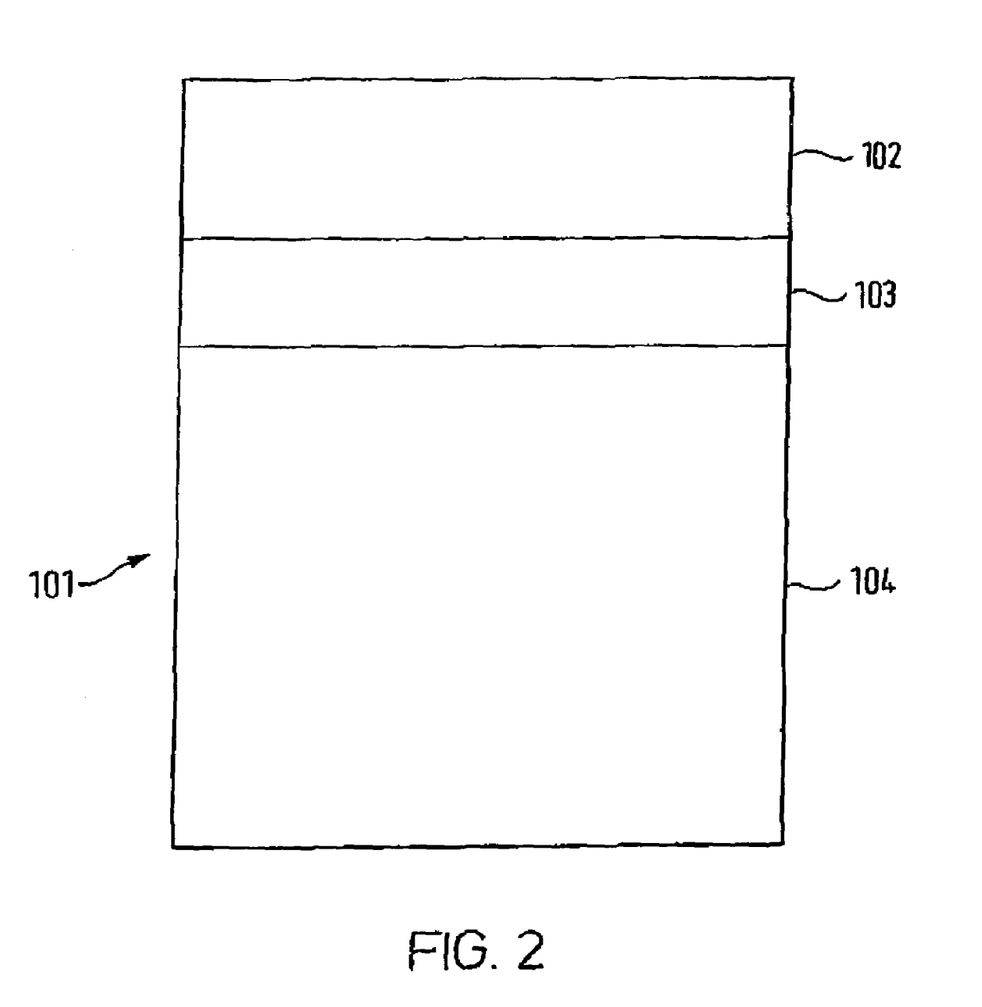
FIG. 2 is a schematic representation of the memory structure of the RFID tag.

FIG. 2 is a schematic representation of the memory structure of the RFID chip 101. Such tags are divided into unique blocks, typically numbering sixteen in total, with data being stored in non-volatile memory EEPROM, the EEPROM having a memory capacity of 512 bits with each block consisting of 4 bytes. However, for the sake of simplicity, in the illustration shown in FIG. 2 the tag is divided into three blocks 102–104 only.

The first block 102 contains unique tag identifiers such as serial numbers, this information being in a read only format and being encoded on the tag at the time of manufacture such that this information cannot be altered once set.

The second block 103 permits write access conditions to be determined for the third block 104, for example to allow read and write access to the remaining blocks. This block may be considered a 'secret area' in that access requires mutual authentication and enciphered data communications are used in this area. The second block 103 may be made read only once information has been written to it, i.e. it may become one time programmable.

The third block 104 can be considered to be a 'user' or 'public' area in that it may be programmed, by block two 103, such that information may be read from or written to it. This is generally the format in operation, information being read from and written to this area. Access can be password protected and data may be in encrypted format to enhance security.

In use, information from block one 102 (i.e. the unique serial number) will generally be used to identify the tag at each stage in a pre-determined process. Environmental data will be transmitted from a separate sensor (not shown) to block three 104, where it can stored and accessed by a reader (not shown). These environmental data can be monitored from a localised or centralised workstation and checked against defined criteria.

Figure 3:
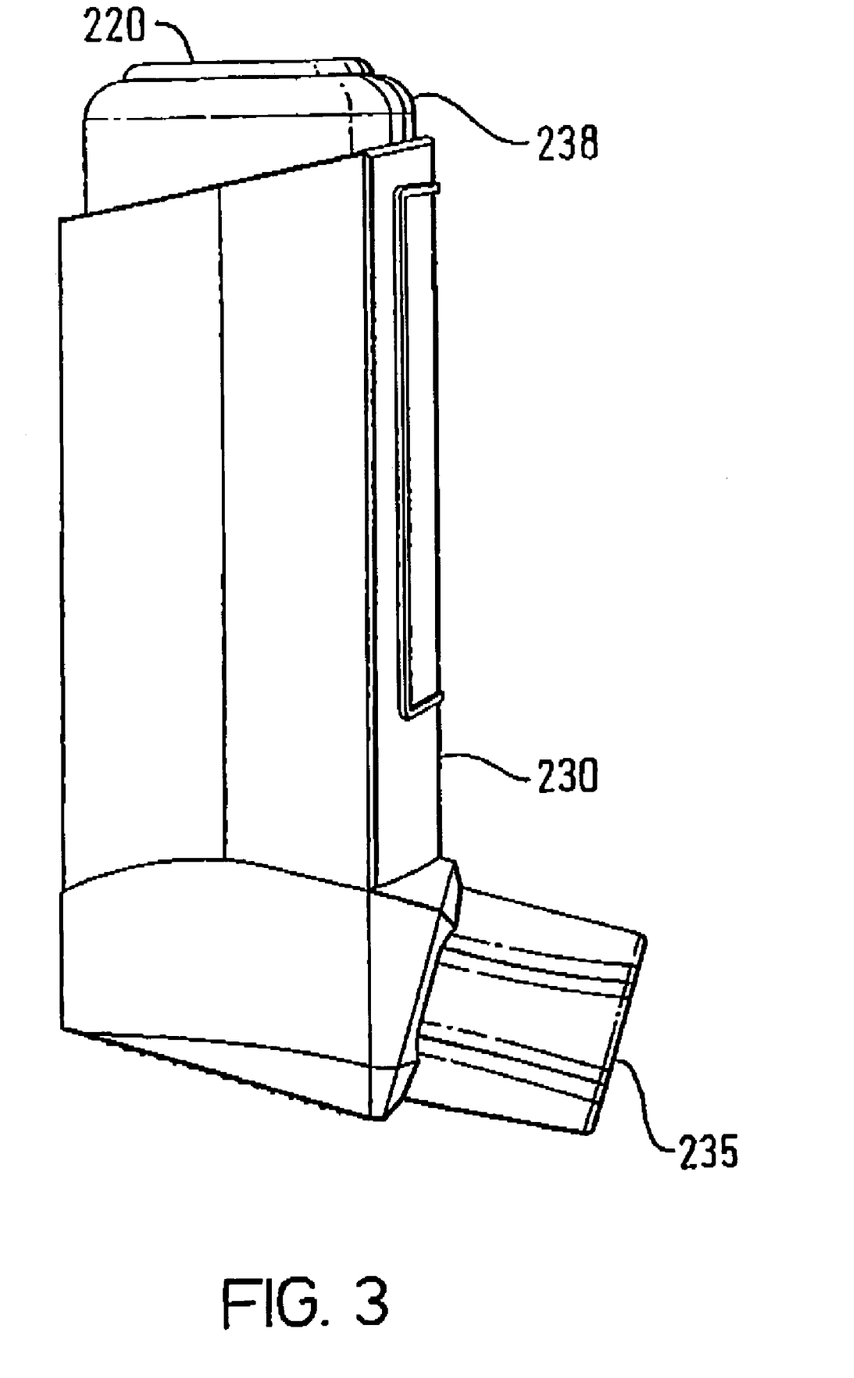
FIG. 3 is a diagram of a metered dose inhaler with a disc shaped RFID tag attached to the aerosol container.

FIG. 3 depicts a standard metered-dose inhaler, comprising housing 230, mouthpiece 235 and aerosol container 238. A RFID tag mounted on a disc shaped carrier 220 is attached to the aerosol container 238. It will be understood from FIG. 1 that different shaped carriers may be used to affix the RFID tag to the housing, the aerosol container or the mouthpiece. Attachment of the disc shaped carrier 220 to the aerosol container 238 may be by adhesive, hermetic or welding means.

Figure 4:
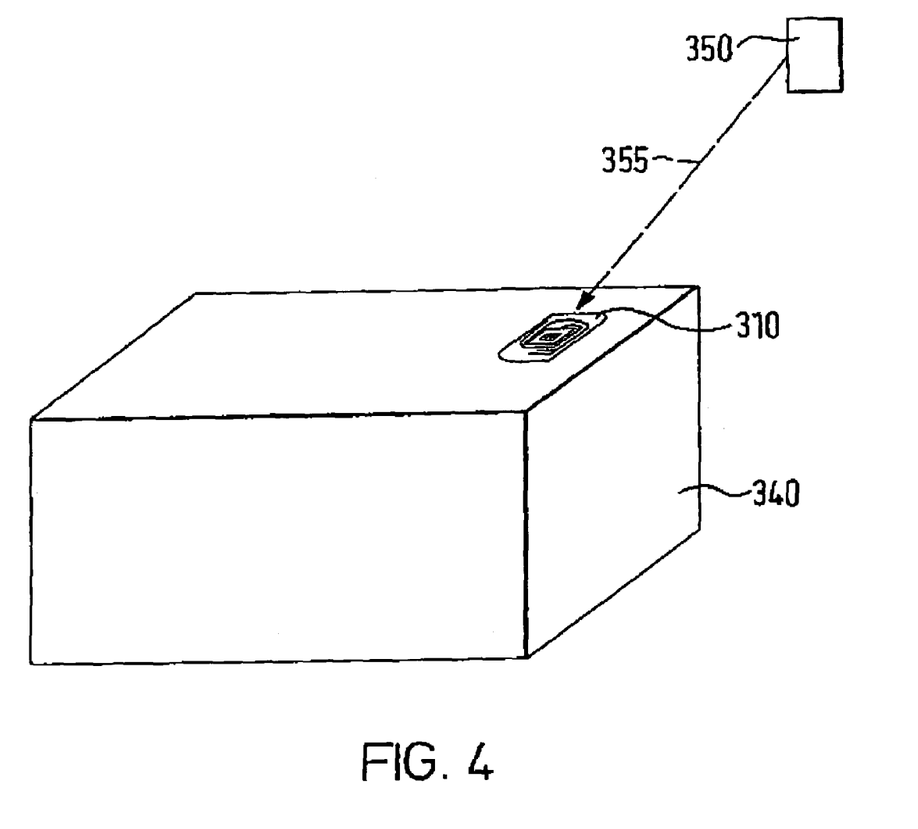
FIG. 4 is a diagram of a RFID tag attached to a container receiving environmental data from a sensor.

A RFID tag 310 is shown attached to a container 340 for an object in FIG. 4. The diagram depicts a sensor 350, located in the same environment as the container 340, transmitting environmental data 355 to the tag 310. The environmental data may for example be temperature or pressure data measured by the sensor. These data will be stored in the memory of the tag 310 and can be accessed on energising by a reader/writer (not shown).

Figure 5:
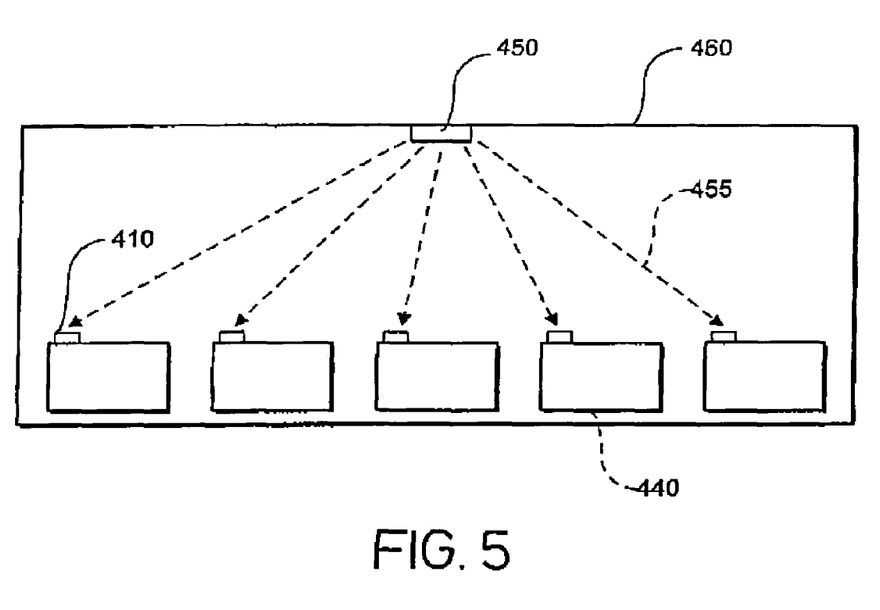
FIG. 5 is a schematic diagram of RFID tags, attached to containers, receiving environmental data from a sensor within a closed environment.

FIG. 5 illustrates a sensor 450 simultaneously transmitting environmental data 455 to individual RFID tags 410 which are attached to a number of containers 440 stored within a much larger container 460. Environmentally sensitive products (not shown), such as medicaments, may be stored within the containers 440. The larger container may, for example, be a cargo/freight container used for the transport or storage of goods.

Figure 6:
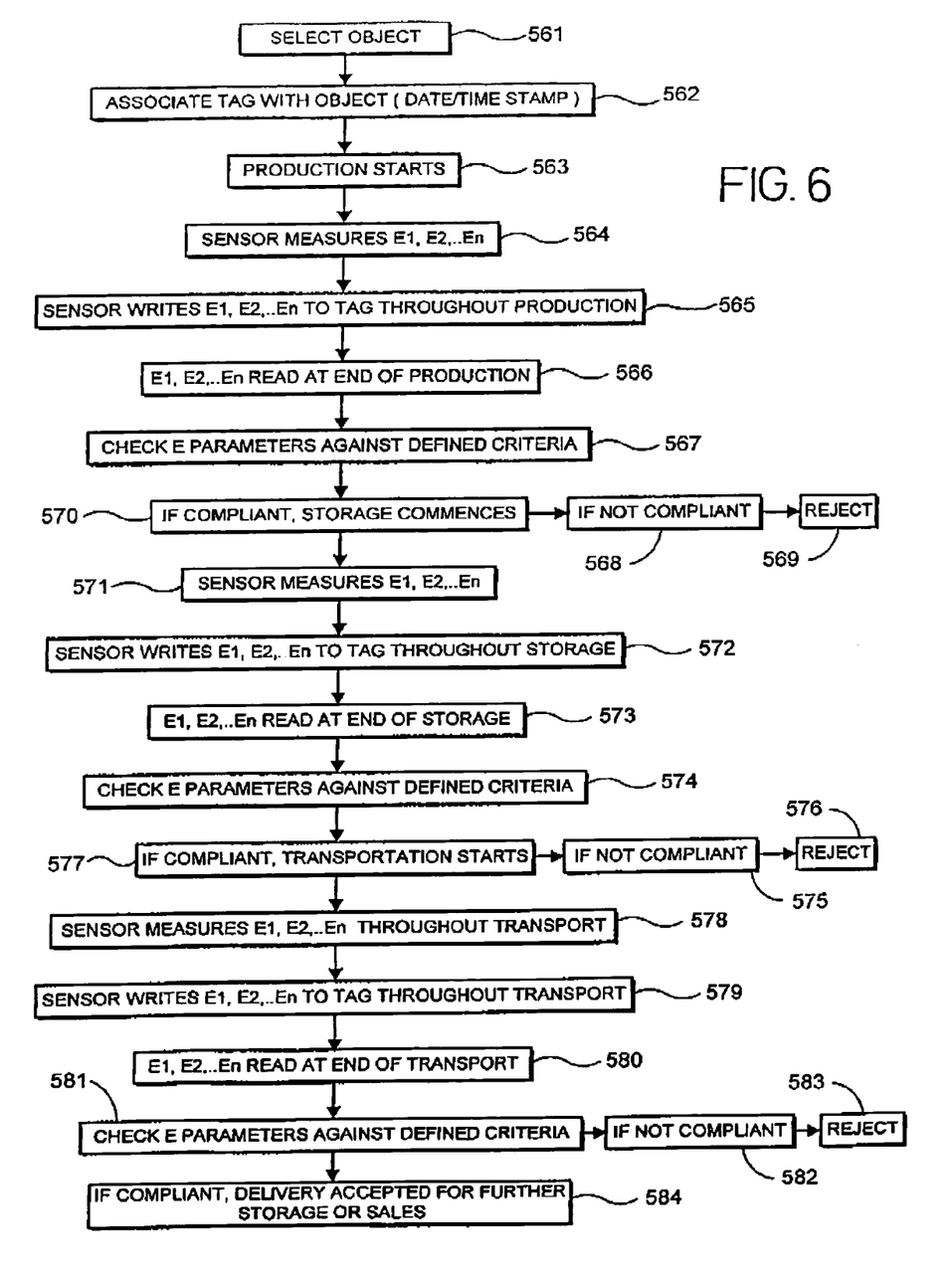
FIG. 6 is a flow diagram of a method of monitoring environmental exposure using RFID tags.

A flow diagram of a method for monitoring or tracking environmental exposure through the lifetime of an object until the point of sales is shown in FIG. 6. The method begins by selecting the object 561 to be tagged with the RFID tag. An association between the object and the tag is made 562 and appropriate information, such as a time/date stamp, is written to the tag chip. The production process then commences 563 and a separate sensor, located within the same environment as the object, continuously measures environmental conditions (E1, E2, . . . En) 564 and writes these as environmental parameters 565 to the tag chip either continuously or at defined intervals throughout production. The environmental data may be analysed by a microprocessor associated with the sensor and the analysed data also transmitted to the tag chip. At the end of the production process the environmental data are read 566 on energising by a reader/writer and checked 567 against defined criteria: if not compliant 568 the object is rejected 569; if compliant, however, storage commences 570.

During storage another sensor measures and may analyse environmental conditions (E1, E2, . . . En) 571, writing these data to the tag chip either continuously or at defined intervals throughout the storage period 572. At the end of this time, the tag is read 573 on energising by a reader/writer and compliance checked against defined environmental exposure criteria 574. Once again, non-compliance 575 results in rejection 576 of the object, whilst compliance permits transportation 577 of the object.

Throughout transportation, which may take the form of road, rail, sea or air freight, a localised sensor located within the same environment as the object measures and may analyse environmental conditions (E1, E2, . . . En) 578, writing 579 these parameters to the tag chip. These data are read at the end of the transportation process 580 on energising by a reader/writer and checked 581 against defined environmental criteria, failure 582 leading to rejection 583 or recall by the manufacturer of the object. If compliant 584, delivery of the object is accepted for a further period of storage or sales.

Figure 7:
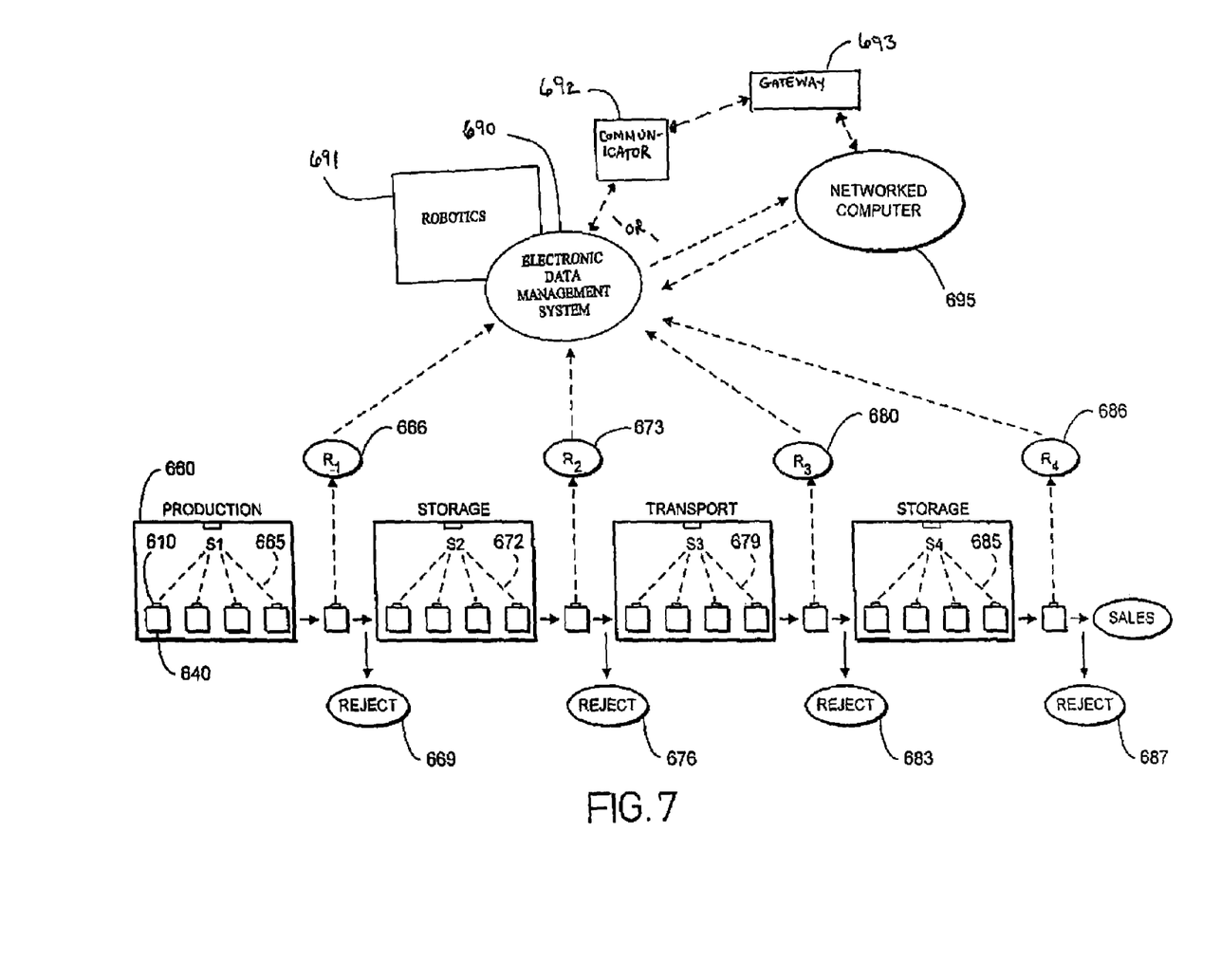
FIG. 7 is a schematic representation of a system employing a method of tracking environmental exposure using RFID tags.
Figure 8:
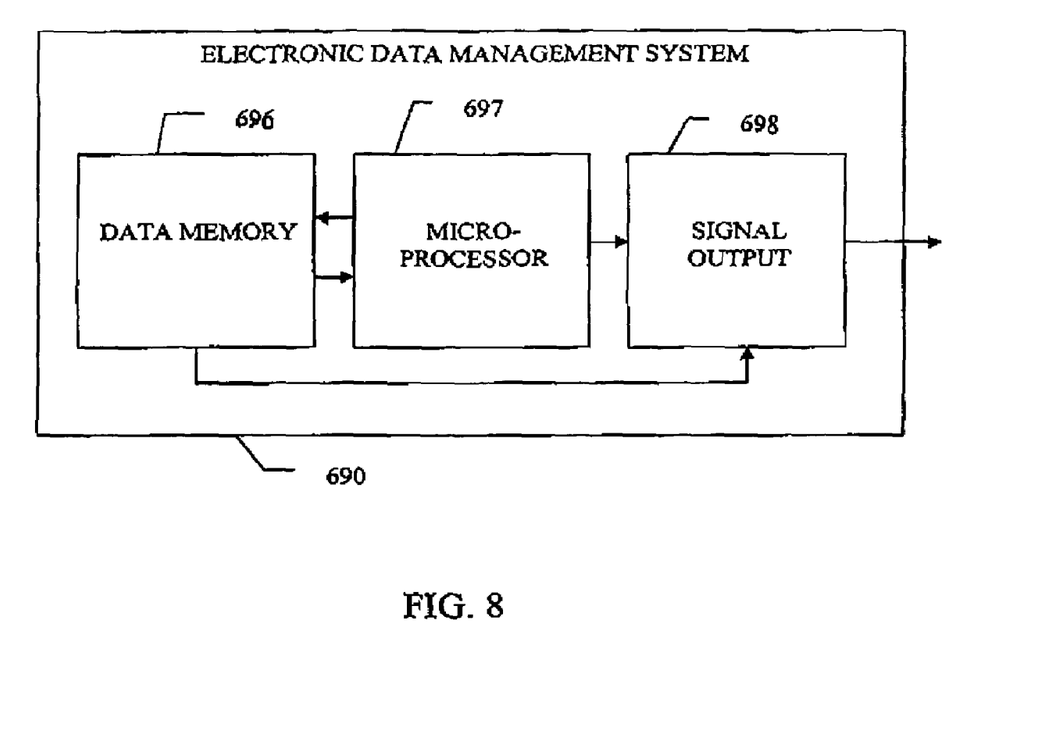
FIG. 8 is a schematic diagram of an electronic data management system.

A schematic representation of a system employing a method for monitoring environmental exposure is shown in FIG. 7. The diagram illustrates a simplified process from manufacture through to sales.

RFID tags 610 are associated with containers 640 for objects during production. Environmental conditions are measured by a separate sensor S1, located within the same environment 660 as the containers, and are written 665 to the tag chips as environmental parameters. The environmental data may also be analysed by a microprocessor associated with the sensor and the analysed data transmitted to the tag chip. At the end of production the environmental data are read 666 for each container 640 on energising by reader/writer R1 and checked for compliance against defined environmental exposure criteria. Failure to comply results in rejection 669 of the container while compliance leads to storage of the goods.

Sensor S2 transmits environmental data 672 to the tag chips throughout storage. A microprocessor associated with the sensor S2 may analyse the environmental data prior to transmitting 672 processed data to the tag chips. At the end of the storage period these data are read 673 for each container on energising by reader/writer R2. Compliance against defined environmental criteria is then assessed, failure leading to rejection of the container 676 while compliance results in transportation of the goods.

During transport, environmental data measured by sensor S3 is continuously transmitted 679 to the tag chips. A microprocessor associated with the sensor S3 may analyse these data and transmit these, in addition to the 'raw' data, to the tag chips. These data are read 680 for each container on energising by reader/writer R3 on arrival at the destination (e.g. a warehouse) and checked for compliance against defined environmental criteria. A further period of storage will now take place if the data pass the compliance check, otherwise the containers will be rejected 683 or recalled to the manufacturer.

Local sensor S4 measures and transmits 685 environmental data to the tag chips during the second storage period. Once again, data may be analysed by a microprocessor associated with the sensor S4 and transmitted to the tag chips. At the end of this time each tag is read 686 on energising by reader/writer R4 and the environmental data compared against defined criteria. Only containers with data which satisfy these criteria will be accepted for sales, failure to comply resulting in rejection 687 or recall of the containers.

In the diagram the process is controlled by an electronic data management system 690 which is capable of receiving information from the reader R1 to R4. The electronic data management system comprises a data memory 696 for storage of data; a microprocessor 697 for performing operation on said data; and a signal output 698 for outputting a signal relating to the data or the outcome of an operation on the data. A robotics system 691 may form part of this system during the production and storage process. The system will carry out the compliance checks against environmental criteria, and notify operators to pass or reject the containers.

The system may also be connected to a networked computer system 695 to allow transfer of data between both systems, preferably the data being in encrypted format. The networked computer system may be a publicly accessible system, such as the internet, or a privately accessible system such as an intranet or extranet. As depicted in FIG. 7, the system may communicate directly with the networked computer 695, or may additionally comprise a communicator 692 for wireless communication with a gateway 693 to a network computer system 695 to enable transfer of data between the network computer system and the electronic data management system.

Figure 9:
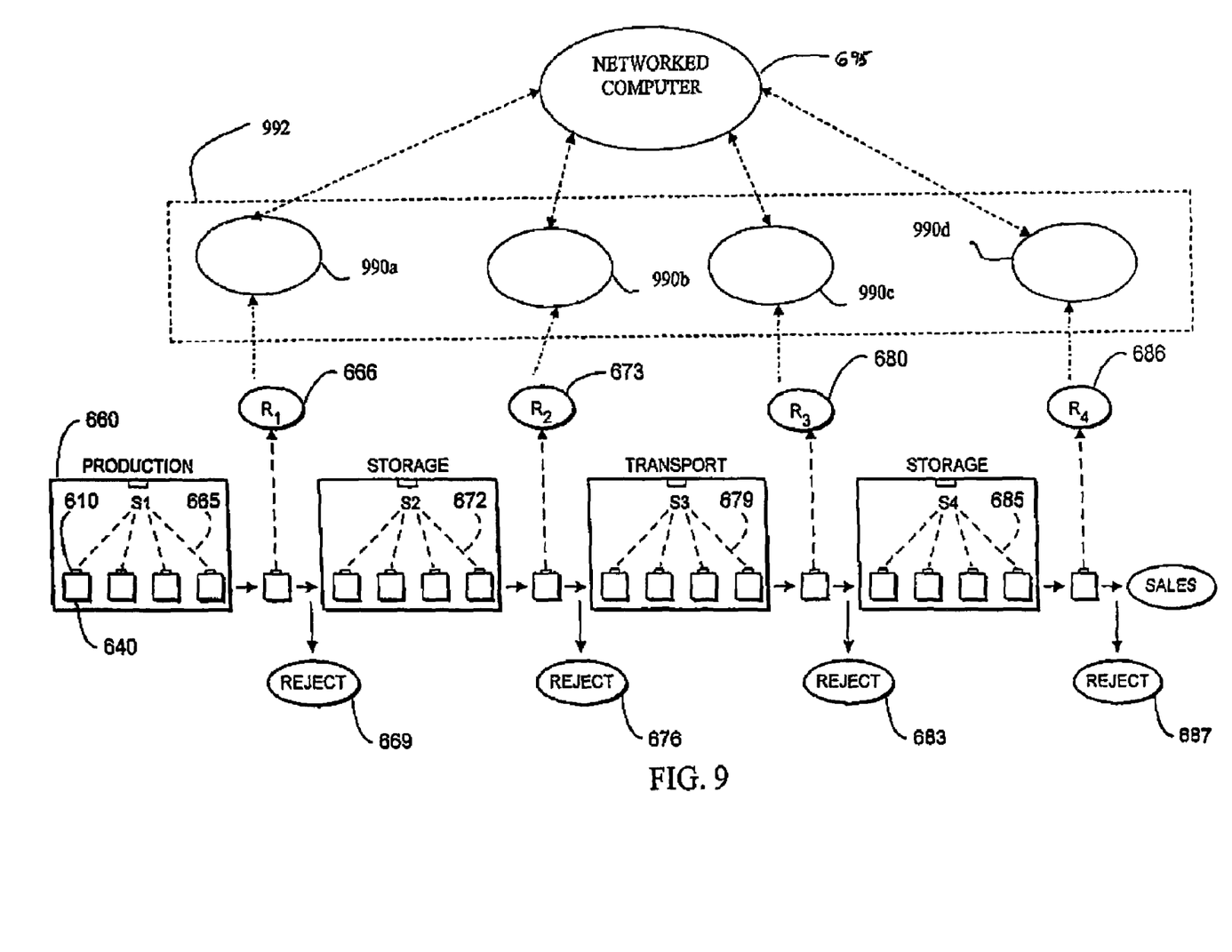
FIG. 9 is a schematic representation of a system empolying a method of tracking environmental exposure using RFID tags.

In further embodiment shown in FIG. 9, the schematic is similar to that depicted with reference to FIG. 7, with identically referenced items performing as previously described. In this embodiment, a plurality of electronic data collectors 990a–990d form a network making up a distributed electronic data management system 992. The electronic data collectors each comprise a data memory for storage of data, a microprocessor for performing operations on said data; and a storage of data, a microprocessor for performing operations on said data; and a signal output for outputting a signal relating to the data or the outcome of an operation on the data. The distributed electronic data management system operates in the system as described with reference to FIG. 7.

It will be understood that variants of the system described above are possible. Thus a system whereby separate sensors within the Production, Storage and Transport environments record environmental data either continuously or at regular intervals and then transfer the data to a reader/writer at the end of each process, is envisaged. In such a system the reader/writer would transmit the environmental data to an electronic data management system and/or to the tag memories at the end of each process. The tags would then be read and compliance assessed as previously described, failure to satisfy predefined environmental criteria resulting in rejection whilst compliant goods would move on to the next stage in the process. The advantage of such a system is that there is no need for the sensors to have the ability to write data to the RFID tags in each environment, the system simply relying on centralised readers/writers present in the production/storage and delivery areas.

The system of the invention is in one aspect suitable for monitoring environmental exposure of medicament such as those for the treatment of ulcers, e.g., omeprazole, lansoprazole, lipid levels, e.g., simvastatin, atorvastatin, hypertension, e.g., amlodipine, depression, e.g. fluozetine, paroxetine, sertraline, allergies, e.g., loratidine, and psychosis, e.g., olanzapine.

In particular, the system of the invention is particularly suitable for monitoring exposure of medicament for the treatment of respiratory disorders. Appropriate medicaments may thus be selected from, for example, analgesics, e.g., codeine, dihydromorphine, ergotamine, fentanyl or morphine; anginal preparations, e.g., diltiazem; antiallergics, e.g., cromoglycate, ketotifen or nedocromil; antiinfectives e.g., cephalosporins, penicillins, streptomycin, sulphonamides, tetracyclines and pentamidine; antihistamines, e.g., methapyrilene; anti-inflammatories, e.g., beclomethasone dipropionate, fluticasone propionate, flunisolide, budesonide, rofleponide, mometasone furoate, ciclesonide or triamcinolone acetonide; antitussives, e.g., noscapine; bronchodilators, e.g., albuterol, salmeterol, ephedrine, adrenaline, fenoterol, formoterol, isoprenaline, metaproterenol, phenylephrine, phenylpropanolamine, pirbuterol, reproterol, rimiterol, terbutaline, isoetharine, tulobuterol or 4-hydroxy-7-[2-[[2-[[3-(2-phenylethoxy)propyl]sulfonyl] ethyl]amino]ethyl-2(3H)-benzothiazolone; diuretics, e.g., amiloride; anticholinergics, e.g., ipratropium, tiotropium, atropine or oxitropium; hormones, e.g., cortisone, hydrocortisone or prednisolone; xanthines, e.g., aminophylline, choline theophyllinate, lysine theophyllinate or theophylline; therapeutic proteins and peptides, e.g., insulin or glucagon; vaccines, diagnostics, and gene therapies. It will be clear to a person skilled in the art that, where appropriate, the medicaments may be used in the form of salts, (e.g., as alkali metal or amine salts or as acid addition salts) or as esters (e.g., lower alkyl esters) or as solvates (e.g., hydrates) to optimise the activity and/or stability of the medicament and/or to minimise the solubility of the medicament in the propellant.

Preferred medicaments are selected from albuterol, salmeterol, ipratropium bromide, fluticasone propionate and beclometasone dipropionate and salts or solvates thereof, e.g., the sulphate of albuterol and the xinafoate of salmeterol.

Medicaments can also be delivered in combinations. Preferred formulations containing combinations of active ingredients contain salbutamol (e.g., as the free base or the sulphate salt) or salmeterol (e.g., as the xinafoate salt) in combination with an antiinflammatory steroid such as a beclomethasone ester (e.g., the dipropionate) or a fluticasone ester (e.g., the propionate). A particularly preferred combination comprises salmeterol xinafoate salt and fluticasone propionate.

It will be understood that the present disclosure is for the purpose of illustration only and the invention extends to modifications, variations and improvements thereto.

The application of which this description and claims form part may be used as a basis for priority in respect of any subsequent application. The claims of such subsequent application may be directed to any feature or combination of features described therein. They may take the form of product, method or use claims and may include, by way of example and without limitation, one or more of the following claims:

What is claimed is:

1. A method for tracking environmental exposure of an object comprising
    selecting said object;
    associating a radiofrequency identifier with the object, the radiofrequency identifier comprising
        an antenna for transmitting or receiving radiofrequency energy; and
        an integrated circuit chip connecting with said antenna, said chip having a memory;
    exposing the object to an environmental condition;
    measuring said environmental condition as an environmental parameter with a sensor physically separate from said radiofrequency identifier;
    transmitting the environmental parameter from said sensor to a reader/writer, and writing said enviromnental parameter from the reader/writer to the memory of the chip by transmitting radiofrequency energy to the radiofrequency identifier.

2. A method according to claim 1, wherein said sensor writes the environmental parameter to said memory of the chip.

3. A method according to claim 1, wherein the sensor measures plural environmental conditions as plural environmental parameters.

4. A method according to claim 1, wherein said environmental condition is selected from the group consisting of temperature, humidity, pressure, electromagnetic radiation, light, acceleration and chemical concentration.

5. A method according to claim 1, wherein said writing of the environmental parameter to the memory is continuously or periodically transmittable from the sensor or said reader/writer.

6. A method according to claim 1, wherein the environmental parameter written to the memory is read from the memory post-production, storage or transport of the object.

7. A method according to claim 1, wherein a data processor associated with the sensor or reader/writer processes the environmental parameter data prior to transmitting them to the memory.

8. A method according to claim 1, additionally comprising reading the memory by transmitting radiofrequency energy from a reader/writer to the radiofrequency identifier.

9. A method according to claim 8, wherein said reading occurs during or post-production, storage or transport of the object.

10. A method according to claim 8, wherein the memory comprises a unique signature data item and said reading step comprises reading said unique signature data item.

11. A method according to claim 8, wherein the reading step additionally comprises reading at least one environmental parameter.

12. A method according to claim 11, additionally comprising checking said at least one environmental parameter against a defined compliance criterion.

13. A method according to claim 12, wherein non-compliance with any check results in rejection of the associated object.

14. A method according to claim 1, additionally comprising a final reading step involving reading all environmental parameters in the memory by transmitting radiofrequency energy to the radiofrequency identifier.

15. A method according to claim 14, additionally comprising checking all environmental parameters against defined full compliance criteria.

16. A method according to claim 15, further including the step of rejecting said object if said checking indicates non-compliance with a portion of or all of said full compliance criteria.

17. A method according to claim 1, wherein the radiofrequency identifier connects to the object.

18. A method according to claim 1, wherein the object is associated with a container and the radiofrequency identifier connects to said container.

19. A method according to claim 18, wherein the container assists in transport of the object.

20. A method according to claim 18, wherein the sensor and the object or the container are exposed to the same environment.

21. A method according to claim 20, wherein said same environment is selected from the group consisting of production facility, warehouse, container transporter and depot.

22. A method according to claim 1, wherein the object is a container for a medicament.

23. A method according to claim 1, wherein the object is a medical device.

24. A method according to claim 23, wherein the medical device is an inhalation device.

25. A method according to claim 24, wherein said inhalation device comprises an aerosol canister containing a suspension of medicament in a propellant.

26. A method according to claim 25, wherein said propellant comprises liquified HFA134a, HFA-227 or carbon dioxide.

27. A method according to claim 25, wherein said aerosol canister comprises a solution of a medicament in a solvent.

28. A method according to claim 27, wherein said medicament is selected from the group consisting of albuterol, salmeterol, fluticasone propionate, ipratropium bromide, beclomethasone dipropionate, salts or solvates thereof and any mixtures thereof.

29. A method according to claim 24, wherein the inhalation device comprises a cartridge for medicament in dry-powder form.

30. A method according to claim 29, wherein said dry-powder cartridge comprises a blister pack.

31. A method according to claim 1, wherein the antenna is capable of transmitting or receiving radiofrequency energy having a frequency of from 50 KHz to 2.5 GHz.

32. A method according to claim 31, wherein the antenna is adapted to transmit or receive radiofrequency energy having a frequency of 125 KHz.

33. A method according to claim 31, wherein the antenna is adapted to transmit or receive radiofrequency energy having a frequency of 13.56 MHz.

34. A method according to claim 31, wherein the antenna is adapted to transmit or receive radiofrequency energy having a frequency of 2.4 GHz.

35. A method according to claim 1, wherein the radiofrequency identifier further includes a carrier suitable for mounting.

36. A method according to claim 35, wherein said carrier is a flexible label.

37. A method according to claim 35, wherein the carrier is a rigid disc.

38. A method according to claim 35, wherein the carrier is a rectangular block.

39. A method according to claim 35, wherein the carrier is mouldable to the object or the container.

40. A method according to claim 35, wherein the carrier encases the radiofrequency identifier.

41. A method according to claim 40, wherein the carrier forms a hermetic seal for the radiofrequency identifier.

42. A method according to claim 35, wherein the carrier comprises an insulating material.

43. A method according to claim 42, wherein said insulating material comprises a glass material, paper material or organic polymeric material.

44. A method according to claim 1, wherein the integrated circuit chip has plural memory areas thereon.

45. A method according to claim 44, wherein any memory area contains data in encrypted form.

46. A method according to claim 1, additionally comprising transferring the environmental parameter read from the memory or transmitted from the reader/writer to an electronic data management system comprising
a data memory for storage of data;
a microprocessor for performing operations on said data; and
a signal output for outputting a signal relating to the data or the outcome of an operation on the data.

47. A method according to claim 46, wherein the electronic data management system forms part of a robotics system.

48. A method according to claim 46, additionally comprising a communicator for wireless communication with a gateway to a network computer system to enable transfer of data between the network computer system and the electronic data management system.

49. A method according to claim 48, enabling two-way transfer of data between the network computer system and the electronic data management system.

50. A method according to claim 48, wherein said data are communicable between the network computer system and the electronic data management system in encrypted form.

51. A method according to claim 48, wherein the network computer system comprises a public access network computer system.

52. A method according to claim 48, wherein the network computer system comprises a private access network computer system and the gateway is a secure gateway.

53. A method according to claim 48, comprising communicating with a user-specific network address in the network computer system.

54. A method according to claim 53, wherein the user-specific network address is selected from the group consisting of a web-site address, an e-mail address and a file transfer protocol address.

55. A method according to claim 1, additionally comprises transferring the environmental parameter read from the memory or transmitted from the reader/writer to a distributed electronic data management system comprising plural electronic data collectors, each comprising
a data memory for storage of data;
a microprocessor for performing operations on said data; and
a signal output for outputting a signal relating to the data or the outcome of an operation on the data,
wherein said plural electronic data collectors are in network relationship to form said distributed electronic data management system.

56. A system for tracking environmental exposure of an object according to the method of claim 1, comprising
a radiofrequency identifier-comprising
an antenna for transmitting and receiving radiofrequency energy; and an integrated circuit chip connecting with said antenna, said chip having a memory;

a physically separate sensor for measuring an environmental condition as an environmental parameter;

a reader/writer to which the sensor transmits the environmental parameter, said environmental parameter being writable to said memory of said chip by transmitting said parameter from said read/writer via radio frequency energy to said radiofrequency identifier.

57. A system according to claim 56, wherein the sensor transmits the environmental parameter to the memory of the chip.

58. A system according to claim 56, additionally comprising a reader/writer for reading data from the radiofrequency identifier by transmitting radiofrequency energy thereto and receiving radiofrequency energy therefrom.

59. A system for tracking environmental exposure of an object comprising
   a. a radiofrequency identifier comprising
      1) an antenna for transmitting and receiving radiofrequency energy; and
      2) an integrated circuit chip connecting with said antenna, said chip having a memory;
   b. a physically separate sensor capable of measuring an environmental condition as an environmental parameter;
   c. a reader/writer for reading data from the radiofrequency identifier by transmitting radiofrequency energy thereto and receiving radiofrequency energy therefrom, wherein the sensor transmits the environmental parameter to said reader/writer which writes the ammeter to the memo of the chip;
   d. an electronic data management system comprising:
      1). a data memory for storage of data;
      2). a microprocessor for performing operations on said data; and
      3). a signal output for outputting a signal relating to the data or the outcome of an operation on the data; and
   e. a network computer system, able to access data from said electronic data management system, comprising
      1). a data memory for storage of data;
      2). a microprocessor for performing operations on said data; and
      3). a signal output for outputting a signal relating to the data or the outcome of an operation on the data; whereby said system operates by a method for tracking environmental exposure of an object comprising:
   f. selecting the object;
   g. associating said radiofrequency identifier with said object,
   h. exposing the object to an environmental condition;
   i. measuring the environmental condition as an environmental parameter with said physically separate sensor;
   j. writing said environmental parameter to said data memory of the chip of said radiofrequency identifier by transmitting radiofrequency energy thereto; and
   k. either, transferring said environmental parameter data from the memory of said radiofrequency identifier-, or transmitting said environmental parameter data from the reader/writer, to said electronic data management system.

* * * * *

UNITED STATES PATENT AND TRADEMARK OFFICE
CERTIFICATE OF CORRECTION

| | | |
|---|---|---|
| PATENT NO. | : 7,009,517 B2 | Page 1 of 1 |
| APPLICATION NO. | : 10/296371 | |
| DATED | : March 7, 2006 | |
| INVENTOR(S) | : Christopher Ivor Wood | |

It is certified that error appears in the above-identified patent and that said Letters Patent is hereby corrected as shown below:

Item (56) On page 2, Col. 1, line 63, under U.S. Patent Documents:
"2003/0783226" should read --2003/0183226--.

Item (56) On page 2, Col. 2, lines 20, 57, 59, under Foreign Patent Documents:
"EP    WO 00/03313" should read --WO    WO 00/03313--;
Please insert --WO  00/21031    4/2000--
"WO 0025720" should read --WO 00/255720--.

Signed and Sealed this

Twenty-seventh Day of January, 2009

JOHN DOLL
*Acting Director of the United States Patent and Trademark Office*